United States Patent
Anderson et al.

(10) Patent No.: US 9,832,924 B2
(45) Date of Patent: Dec. 5, 2017

(54) SYSTEM FOR MOUNTING A HOPPER TO A PRODUCT METERING ASSEMBLY OF AN AGRICULTURAL ROW UNIT

(71) Applicant: CNH Industrial America LLC, New Holland, PA (US)

(72) Inventors: Brian John Anderson, Yorkville, IL (US); Chad M. Johnson, Arlington Heights, IL (US); Johnathon R. Dienst, DeKalb, IL (US); Ryan R. Raetzman, Lemont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/796,534

(22) Filed: Jul. 10, 2015

(65) Prior Publication Data

US 2017/0006769 A1    Jan. 12, 2017

(51) Int. Cl.
| | |
|---|---|
| A01C 15/00 | (2006.01) |
| A01C 7/06 | (2006.01) |
| A01C 7/20 | (2006.01) |
| A01C 7/04 | (2006.01) |

(52) U.S. Cl.
CPC .............. *A01C 7/201* (2013.01); *A01C 7/06* (2013.01); *A01C 7/20* (2013.01); *A01C 15/006* (2013.01); *A01C 7/046* (2013.01)

(58) Field of Classification Search
USPC .............................................. 111/52, 62–65
See application file for complete search history.

(56) References Cited

U.S. PATENT DOCUMENTS

| | | |
|---|---|---|
| 2,047,713 A | 7/1936 | Simpson |
| 2,106,901 A | 2/1938 | Rassmann |
| (Continued) | | |

FOREIGN PATENT DOCUMENTS

DE    8712070 U1    1/1989

OTHER PUBLICATIONS

Delouche, et al., "Seed Equipment and Facility Recommendations for Maize and Oil Seeds Project," TA 82-6, 1982, p. 52 and 82, Seed Technology Laboratory Mississippi State University, Mississippi State, MS.

(Continued)

*Primary Examiner* — Alicia Torres
(74) *Attorney, Agent, or Firm* — Rebecca L. Henkel; Rickard K. DeMille (57) ABSTRACT

An agricultural row unit includes a hopper configured to store agricultural product, a mounting assembly configured to removably couple the hopper to a chassis of the agricultural row unit, and a flow control assembly coupled to the hopper and configured to selectively block flow of the agricultural product through a product passage of the hopper. The product passage is configured to convey the agricultural product from a product storage portion of the hopper to a product metering assembly of the agricultural row unit while the hopper is coupled to the chassis. The mounting assembly is configured to engage the hopper remote from an outlet of the product passage and from the flow control assembly, and the mounting assembly is configured to support a substantial portion of a load associated with the hopper and any agricultural product stored within the hopper.

10 Claims, 7 Drawing Sheets

(56) References Cited

U.S. PATENT DOCUMENTS

| | | | | |
|---|---|---|---|---|
| 2,124,198 | A | * | 7/1938 | Kriegbaum .......... A01C 15/006 111/186 |
| 2,743,801 | A | | 5/1956 | Faust et al. |
| 2,774,636 | A | | 12/1956 | Whitlock |
| 2,912,089 | A | | 11/1959 | Krause |
| 3,893,515 | A | * | 7/1975 | Sadler .................... A01B 33/16 111/133 |
| 3,949,686 | A | * | 4/1976 | Johnson ............... A01B 69/024 111/200 |
| 4,359,952 | A | * | 11/1982 | Gesior .................... A01C 7/06 111/186 |
| 4,485,939 | A | * | 12/1984 | Gafford .................. A01C 7/06 111/73 |
| 4,884,724 | A | * | 12/1989 | Schmidt .................. A01C 7/16 198/669 |
| 5,313,769 | A | | 5/1994 | Barnes et al. |
| 5,740,747 | A | * | 4/1998 | Stufflebeam ........... A01C 7/046 111/185 |
| 6,116,172 | A | | 9/2000 | Prairie et al. |
| 6,308,645 | B1 | * | 10/2001 | Newkirk ................ A01C 7/126 111/184 |
| 2002/0050238 | A1 | * | 5/2002 | Crabb .................... A01C 7/042 111/185 |
| 2015/0319919 | A1 | * | 11/2015 | Sauder .................. A01C 7/046 111/171 |

OTHER PUBLICATIONS

Flexible Connector, 2-¼ In, L, http://www.grainger.com/Grainger/FERNCO-Flexibie-Connector-2ZU13?Pid=search, p. 1, last accessed Jul. 10, 2015.

\* cited by examiner

SYSTEM FOR MOUNTING A HOPPER TO A PRODUCT METERING ASSEMBLY OF AN AGRICULTURAL ROW UNIT

BACKGROUND

The invention relates generally to ground working equipment, such as agricultural equipment, and more specifically, to a system for mounting a hopper to a product metering assembly of an agricultural row unit.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds.

In certain configurations, each row unit includes a hopper configured to provide agricultural product (e.g., seeds, fertilizer, etc.) to a product metering assembly. The product metering assembly, in turn, controls flow of the agricultural product to the seed tube. As will be appreciated, it may be desirable to access the product metering assembly (e.g., for cleaning and/or maintenance operations). For example, to access the product metering assembly, the hopper is typically drained of product, and subsequently removed from the row unit. Unfortunately, the process of removing the hopper may be time consuming because the hopper is typically bolted to the product metering assembly. In addition, the process of draining the hopper may result in wasted product.

BRIEF DESCRIPTION

In accordance with one embodiment, an agricultural row unit includes a hopper configured to store agricultural product, a mounting assembly configured to removably couple the hopper to a chassis of the agricultural row unit, and a flow control assembly coupled to the hopper and configured to selectively block flow of the agricultural product through a product passage of the hopper. The product passage is configured to convey the agricultural product from a product storage portion of the hopper to a product metering assembly of the agricultural row unit while the hopper is coupled to the chassis. The mounting assembly is configured to engage the hopper remote from an outlet of the product passage and from the flow control assembly, and the mounting assembly is configured to support a substantial portion of a load associated with the hopper and any agricultural product stored within the hopper.

In accordance with another embodiment, a flow control assembly for an agricultural row unit includes a housing coupled to a product passage of a hopper, and a gate selectively movable relative to the housing, such that the gate is configured to block flow of agricultural product through the product passage while the gate is in a closed position, and the gate is configured to facilitate flow of the agricultural product through the product passage while the gate is in an open position. The hopper is selectively removable from a product metering assembly of the agricultural row unit, and the product passage is configured to convey the agricultural product from a product storage portion of the hopper to the product metering assembly while the hopper is engaged with the product metering assembly and the gate is in the open position.

In accordance with a further embodiment, a mounting assembly for a hopper of an agricultural row unit includes a first support assembly extending from a chassis of the agricultural row unit, such that a mounting portion of the first support assembly is configured to engage the hopper on a first side of a product passage of the hopper, and the product passage is configured to facilitate flow of agricultural product from the hopper to a product metering assembly of the agricultural row unit. The mounting assembly also includes a second support assembly extending from the chassis of the agricultural row unit. The mounting portion of the second support assembly is configured to engage the hopper on a second side of the product passage, opposite the first side. An inlet to the product metering assembly is configured to engage an outlet of the product passage. The first and second support assemblies are configured to support a substantial portion of a load associated with the hopper and any agricultural product stored within the hopper, and the respective mounting portions of the first and second support assemblies are configured to engage the hopper remote from the outlet of the product passage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
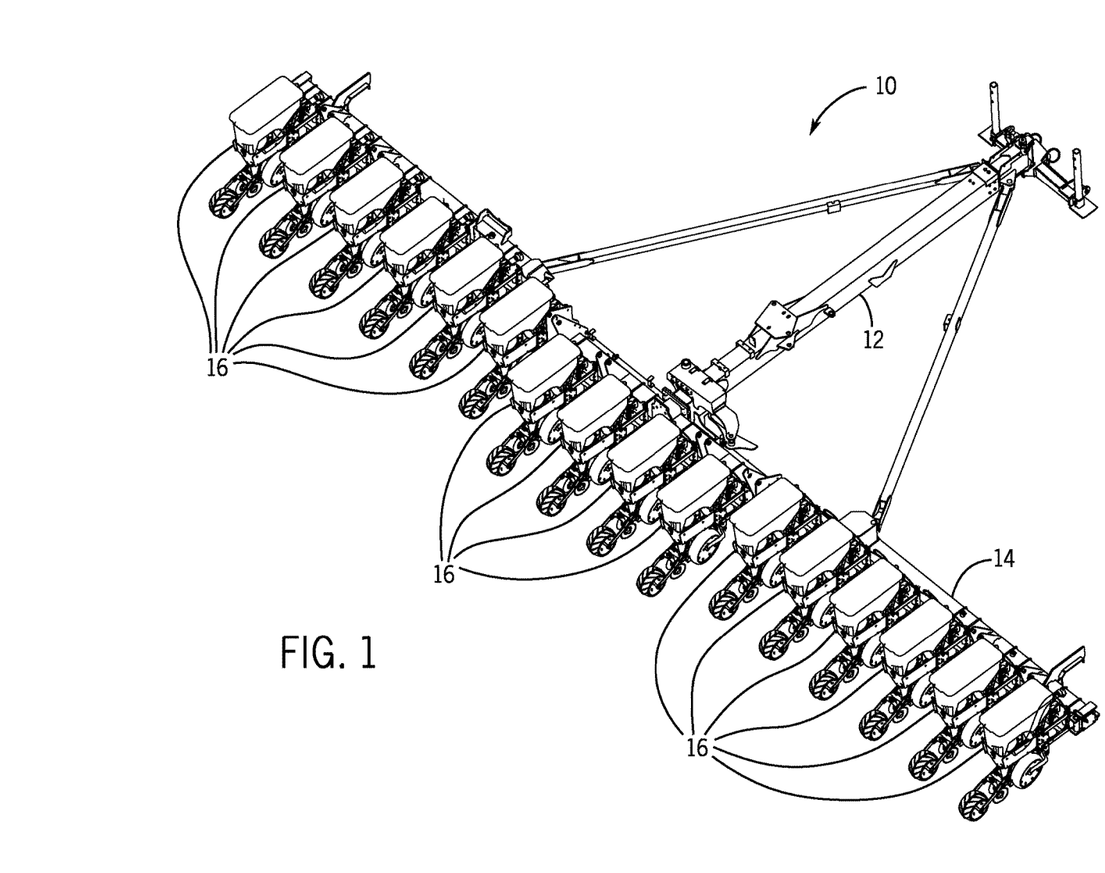
FIG. 1 is a perspective view of an embodiment of an agricultural implement having multiple row units.

Turning now to the drawings, FIG. 1 a perspective view of an embodiment of an agricultural implement 10 having multiple row units 16. The implement 10 is configured to be towed behind a work vehicle such as a tractor. The implement 10 includes a tongue assembly 12 which is in the form of an A-frame hitch assembly. The tongue assembly 12 may include a hitch for attaching to an appropriate tractor hitch via a ball, clevis, or other coupling. For example, a tongue of the implement may be connected to a drawbar of the tractor, or a mast of the implement may be connected to a 3-point hitch of the tractor. The tongue assembly 12 is coupled to a tool bar 14 which supports multiple agricultural row units 16.

As discussed in detail below, a mounting assembly may removably couple a product hopper to a chassis of the agricultural row unit 16, and a flow control assembly may be coupled to the product hopper to selectively block the flow of the agricultural product through a product passage of the product hopper. The mounting assembly may be configured to support a substantial portion of a load (e.g., weight) of the product hopper and any product stored within the product hopper. The mounting assembly may include a first support assembly and a second support assembly that extend from a chassis of the agricultural row unit 16. The first support assembly may engage the product hopper on a first side of the product passage, and the second support assembly may engage the product hopper on a second side of the product passage. In one embodiment, one of the support assemblies (e.g., the first support assembly) may include a rod configured to engage a groove in a structural support extending from the first side of the product hopper, and another support assembly (e.g., the second support assembly) may include a support plate configured to engage a bottom surface of the product hopper. Utilizing the mounting assembly allows a substantial portion of the load (e.g., weight) of the product hopper and the product contained in the product hopper to be distributed among the support assemblies to protect a product metering assembly from bearing the weight of the entire load.

The agricultural row unit 16 may also include a flow control assembly that includes a housing coupled to the product passage and a gate, which is selectively moveable. The gate may be configured to block the flow of agricultural product flowing through the product passage when the gate is in a closed position. In addition, the gate may be configured to facilitate the flow of agricultural product through the product passage while the gate is in an open position. The housing may include an interface plate and an outlet portion coupled to one another by at least one fastener. The interface plate and the outlet portion may form an opening configured to receive the gate. The outlet portion may include at least one tapered end to engage an inlet of the product metering assembly and to facilitate alignment of the housing with the inlet. A flexible seal may be coupled to the outlet portion and configured to engage the inlet of the product metering assembly. The flexible seal may be configured to block flow of the agricultural product out of an interface between the inlet to the product metering assembly and the housing. The flow control assembly enables a user of the agricultural row unit to access the product metering assembly for access, repair, and/or inspection of the product metering assembly.

Figure 2:
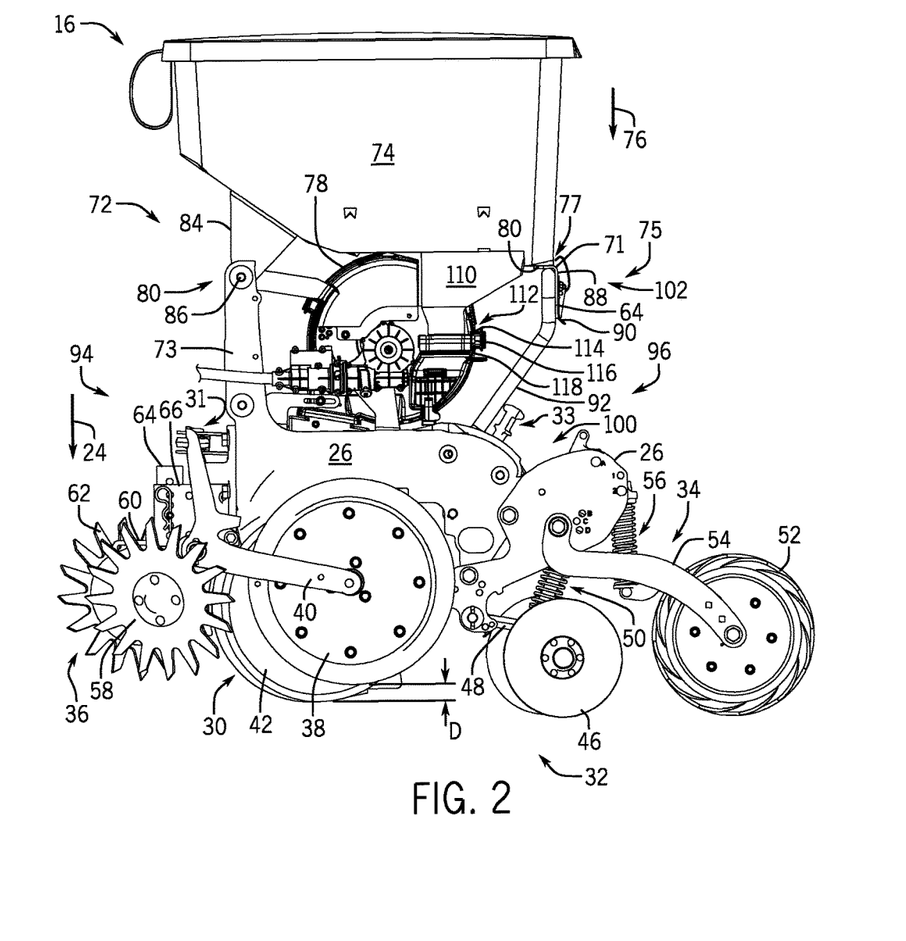
FIG. 2 is a side view of an embodiment of a row unit that may be employed within the agricultural implement of FIG. 1.

FIG. 2 is a side view of an embodiment of a row unit 16 that may be employed within the agricultural implement 10 of FIG. 1. The agricultural row unit 16 may include a parallel linkage assembly, also known as a four bar linkage, configured to couple the agricultural row unit 16 to the tool bar 14, while enabling vertical movement of the agricultural row unit 16. In addition, a down force cylinder may extend between a mounting bracket and a lower portion of the parallel linkage to establish a contact force between the agricultural row unit 16 and the soil. The down force cylinder may be configured to apply a force to the agricultural row unit 16 in a downward direction 24, thereby driving a ground engaging tool into the soil. As will be appreciated, a desired magnitude of down force may vary based on soil type, the degree of tillage applied to the soil, soil moisture content, amount of residue cover, and/or tool wear, among other factors. Because such factors may vary from one side of the implement 10 to the other, a different magnitude of down force may be selected for each agricultural row unit 16.

Furthermore, a desired magnitude of down force may be dependent on the speed at which the agricultural row unit 16 is pulled across the field. For example, as speed increases, the ground engaging tools may have a tendency to rise out of the ground due to the interaction between the soil and the tool. Consequently, a greater down force may be applied during higher speed operation to ensure that the ground engaging tools remain at a desired depth. In addition, the weight of the agricultural row unit 16 applies a force to the ground engaging tools in the downward direction 24. However, as seeds and/or other products are transferred from a hopper of the agricultural row unit 16 to the soil, the weight of the agricultural row unit 16 decreases. Therefore, the down force cylinder may apply a greater force to the agricultural row unit 16 to compensate. Because each agricultural row unit 16 includes an independent down force cylinder, the contact force may vary across the implement 10, thereby establishing a substantially uniform seed deposition depth throughout the field.

The parallel linkage elements may be pivotally coupled to a chassis 26 of the row unit 16 and/or to a mounting assembly 72. As illustrated, the chassis 26 supports an opener assembly 30, a soil closing assembly 32, a press assembly 34, and a residue manager assembly 36. In the present configuration, the opener assembly 30 includes a gauge wheel assembly having a first opener disk and a rotatable arm 40 which functions to movably couple the first opener disk 38 to the chassis 26. The first opener disk 38 may be positioned a vertical distance D above a second opener disk 42 to establish a desired trench depth for seed deposition into the soil. As the agricultural row unit 16 travels across a field, the second opener disk 42 excavates a trench into the soil, and seeds are deposited into the trench. The opener assembly 30 also includes a depth control linkage 31 adjusted with a depth control handle 33. The depth control linkage 31 is configured to adjust the penetration depth D of the second opener disk 42 by varying a position of the gauge wheel 38 relative to the chassis 26. In such configurations, the opener disks 42 may be angled toward one another to establish a wider trench within the soil.

As will be appreciated, seeds may be deposited within the excavated trench via a seed tube extending between a product metering system and the soil. The seed tube exit may be positioned aft of the opener assembly 30 and forward of the closing assembly 32, such that seeds flow into the trench. Closing disks 46 of the closing assembly 30 push the excavated soil into the trench, thereby closing the trench. As illustrated, the closing assembly 32 includes an arm 48 extending between the chassis 26 and the closing disk 46. A closing disk spring 50 is coupled to the arm 48 of the closing assembly 32, and configured to control a contact force between the closing disk 46 and the soil. For example, a large contact force may be applied to effectively push dense soil into the trench, while a relatively small contact force may be applied to close a trench within loose soil. In addition, certain embodiments may employ closing wheels instead of the illustrated closing disk 46.

As illustrated, a press wheel 52 of the press wheel assembly 34 is positioned aft of the closing assembly 32, and serves to pack soil on top of the deposited seeds. In the present embodiment, the press wheel assembly 34 includes an arm 54 extending between the chassis 26 and the press wheel 52. A press wheel spring 56 is coupled to the arm 54 of the press wheel assembly 34, and configured to control a contact force between the press wheel 52 and the soil. For example, in dry conditions, it may be desirable to firmly pack soil directly over the seeds to seal in moisture. In damp conditions, it may be desirable to leave the soil over the seeds fairly loose in order to avoid compaction which may result in seed crusting. The process of excavating a trench into the soil, depositing seeds within the trench, closing the trench, and packing soil on top of the seeds establishes a row of planted seeds within a field. By employing multiple agricultural row units 16 distributed along the tool bar 14, as shown in FIG. 1, multiple rows of seeds may be planted within the field.

Certain embodiments of the agricultural row unit 16 may employ a residue manager assembly 36 to prepare the ground before seed deposition. As illustrated, the residue manager assembly 36 includes a wheel 58 coupled to the chassis 26 by an arm 60. The wheel 58 includes tillage points or fingers 62 configured to break up crop residue on the soil surface. A residue manager stem 64 extends from a bracket 66 to the arm 60 of the residue manager assembly 36, and is configured to control a contact force between the wheel 58 and the soil. While two residue manager wheels 58 are shown in the present embodiment, it should be appreciated that alternative embodiments may include a single wheel 58. In the illustrated embodiments, the row unit 16 includes a mounting assembly 72 configured to support various elements of the agricultural row unit 16, such as a product hopper 74 (e.g., the weight of the hopper 74 and the product contained within the product hopper 74). The mounting assembly 72 distributes the weight of the product hopper 74 and its contents (e.g., agricultural product) to the chassis 26 via elements of the mounting assembly 72 (e.g., a first support assembly 73 and a second support assembly 75). By supporting a substantial portion of the weight (e.g., load 76) of the product hopper 74, the mounting assembly 72 substantially reduces the load on a product metering assembly 78 disposed beneath the product hopper 74. A substantial portion of the load 76 may be supported by the first support assembly 73 and the second support assembly 75. In some embodiments, the mounting assembly 72 may include a single support assembly instead of two support assemblies. Alternatively, the mounting assembly 72 may include more than two support assemblies (e.g., 3, 4, 5, 6, or more support assemblies).

The product hopper 74 is removably coupled to the mounting assembly 72 at connection points 80. The connection points 80 may be disposed at various locations along the mounting assembly 72 (e.g., at rod 86 and at beams 92). In the illustrated embodiment, the connection points 80 are positioned at opposite longitudinal ends of the mounting assembly 72. However, it should be appreciated that the connection points 80 may be disposed along the mounting assembly 72 at various points in alternative embodiments. The connection points 80 enable the product hopper 74 to connect to the mounting assembly 72 on a first side 94 (e.g., longitudinally forward side) and a second side 96 (e.g., longitudinally rearward side) of a product passage 110. The first support assembly 73 is configured to engage the product hopper 74 on the first side 94 of the product passage 110, and the second support assembly 75 is configured to engage the product hopper 74 on the second side 96 of the product passage 110. Alternatively, the first support assembly 73 may be configured to engage the product hopper 74 on the second side 96 of the product passage 110, and the second support assembly 75 may be configured to engage the product hopper 74 on the first side 94 of the product passage 110. In the illustrated embodiment, a structural support 84 is disposed on (e.g., extending from) the product hopper 74 on the first side 94 of the product passage 110. However, in alternative embodiments, the structural support 84 may be disposed (e.g., extend from) the product hopper on the second side of the product passage 96. The structural support 84 may be welded, brazed, or otherwise connected to the product hopper 74. Alternatively, the structural support 84 may be integrally formed with the hopper body (e.g., via an injection molding process). As described in further detail below, the structural support 84 includes a C-shaped cutout (e.g., groove). The C-shaped cutout enables the structural support 84 to engage the rod 86, thereby establishing one connection point 80. In the illustrated embodiment, the second support assembly 75 includes a support plate 88 that is configured to engage a bottom surface 71 of the product hopper 74, thereby establishing a second connection point 80.

As illustrated, the beams 92 support part of the load 76 of the product hopper 74. In the illustrated embodiment, the beams 92 are coupled at a first end 100 to the chassis 26 via fasteners, for example. The fasteners enable the beams 92 to be removably coupled to the chassis 26. The beams 92 are configured to engage the product hopper 74 at a second end 102 of the beams 92 via a latch 104. The latch 104 may be welded or otherwise coupled onto the support plate 88, which in turn, is coupled to the beams 92. In some embodiments, latch 104 may be employed to couple the product hopper 74 to both support assemblies. Alternatively, the latch 104 can be coupled on both sides of the product hopper 74. The latch 104 is configured to engage a lip 77 of the product hopper 74 to secure the product hopper 74 to the mounting assembly 72. The support plate 88 is disposed on the beams 92 to support the product hopper 74.

The product hopper 74 includes a product passage 110 that distributes product from a storage portion of the product hopper 74 to the product metering assembly 78. The product passage 110 may be coupled to the product hopper 74 by welding, by brazing, by fasteners, or other suitable techniques that secure the product passage 110 to the product hopper 74. The product passage 110 may be removably coupled to the product hopper 74, or the product passage 110 may be configured to stay connected with the product hopper 74 when the product hopper 74 is removed from the mounting assembly 72, as shown in the illustrated embodiment. In certain embodiments, the product passage 110 may be integrally formed with the product hopper 74.

The product passage 110 is coupled to a flow control assembly 112, which includes a flexible seal (e.g., flexible connection). The flow control assembly 112 enables the product hopper 74 to be unlatched and removed from the product metering assembly 78 to facilitate access to the product metering assembly 78. As described in detail below, the flow control assembly 112 includes an interface plate 116, an outlet portion 118, a gate, gate supports disposed on an interior surface of the outlet portion 118, a gasket (e.g., forming the flexible seal) including one or more gasket pieces, and gate fasteners. The flow control assembly 112 enables a user of the agricultural row unit 16 to access the product metering assembly 78 for access, repair, and/or inspection of the product metering assembly 78. For example, the user may close the gate to block the flow of product from the product hopper 74 to the product metering assembly 78 and then disengage the latch 104. The user can then tilt the product hopper 74 forward by rotating the product hopper 74 along the C-shaped cut outs (e.g., grooves) to remove (e.g., lift up) the product hopper 74 from the rod 86.

Figure 3:
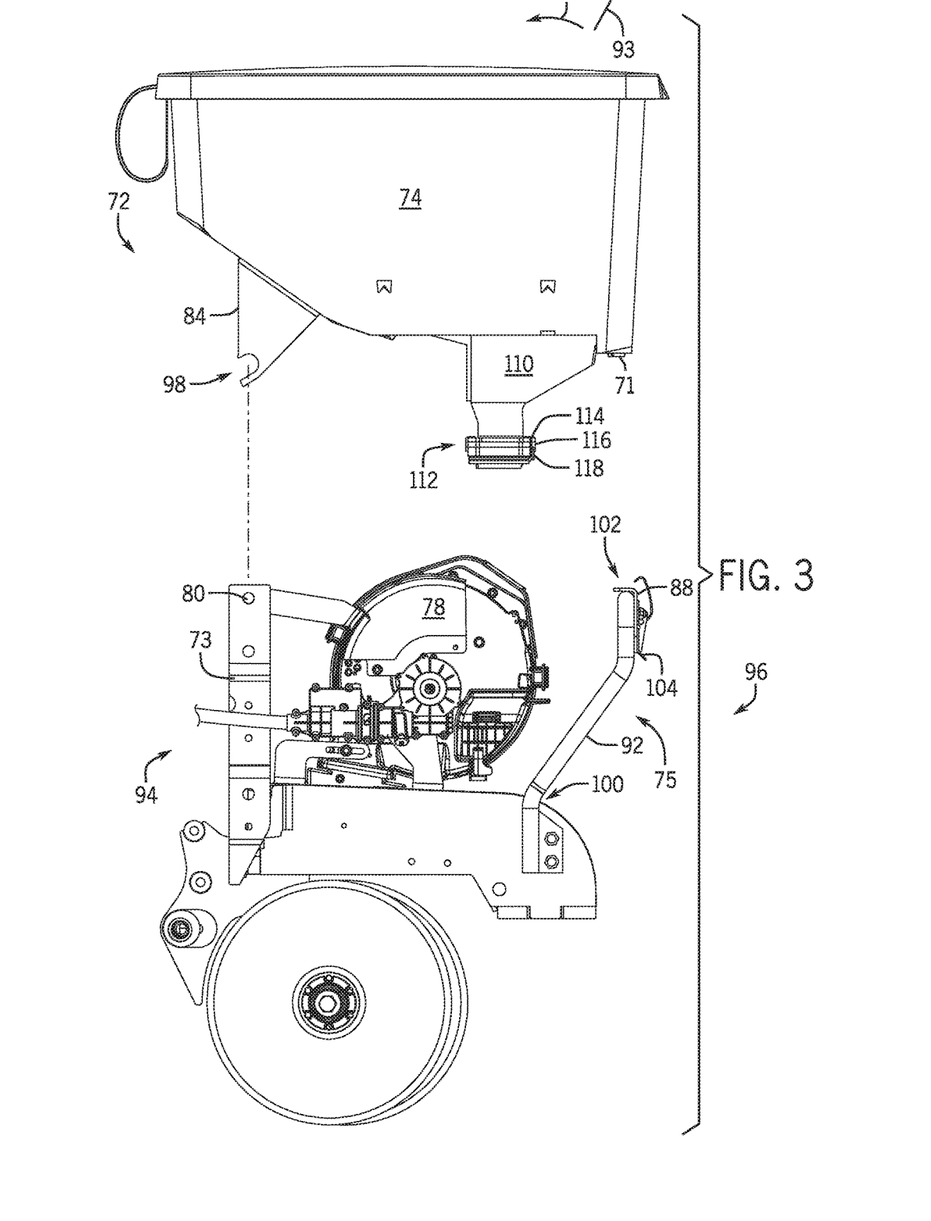
FIG. 3 is a side view of the row unit of FIG. 2, in which the hopper is removed from a mounting assembly.

FIG. 3 is a side view of the row unit 16 of FIG. 2, in which the product hopper 74 is removed from the mounting assembly 72. As described above, the product hopper 74 is removably coupled to the mounting assembly 72 at connection points 80. The mounting assembly 72 reduces the weight applied by the product hopper 74 and its contents onto the product metering assembly 78. The product hopper 74 may be removed from the mounting assembly 72 in its entirety so that the product hopper 74 is completely separated from the mounting assembly 72. Accordingly, the user may access the product meter assembly 78. The product hopper 74 is removable from the mounting assembly 72 by uncoupling the latch 104 from the lip of the product hopper 74. The product hopper 74 is then rotated in a direction 91 until the C-shaped cut out 98 (e.g., groove) in the structural support 84 is oriented at an angle that enables the product hopper 74 to be translated into a direction 93. As a result of the translation in the direction 93, the product hopper 74 is separated from the rod 86, thereby enabling the user to place the product hopper 74 in a desired location and to access the product metering system 78. Alternatively, in some embodiments, e.g., without grooves, the product hopper 74 may be otherwise suitably removed from the mounting assembly (e.g., by uncoupling fasteners, by disengaging latches, etc.). In certain embodiments, the product hopper 74 may be uncoupled from the second support assembly 75 only to access certain parts (e.g., product metering assembly 78, flow control assembly 112, etc.) while the first support assembly 73 remains coupled to the product hopper 74. For example, the product hopper 74 may be removed (e.g., unlatched and rotated away from) the second support assembly 75 to access certain parts of the row unit. After being completely removed, the product hopper 74 can be reattached to the mounting assembly 72 by positioning the groove 98 onto the rod 86 and then rotating the product hopper 74 until the bottom 71 of the product hopper 74 contacts the support plate 88. The latch 104 may then be engaged to secure the product hopper 74 to the mounting assembly. The product hopper 74 may then be positioned back into its assembled position.

With the product hopper 74 secured to the mounting assembly, the beams 92 and the first support assembly 73 support a substantial portion (e.g., more than 50 percent, more than 70 percent, more than 90 percent, more than 95 percent, etc.) of the load 76 of the product hopper 74. The beams 92 are coupled at their first end 100 to the chassis 26 via one or more fasteners. The beams 92 are configured to be coupled at their second end 102 to the product hopper 74 via the latch 104. In some embodiments, the latch 104 is welded or otherwise coupled onto the support plate 88. The support plate 88, in turn, is coupled to the beams 92 and configured to be disposed between the beams 92 and the product hopper 74 to support the product hopper 74. The product hopper 74 is coupled to a product passage 110 that distributes agricultural product from the hopper 74 to the product metering assembly 78. The product passage 110 may be coupled to the product hopper 74 by welding, by brazing, by fasteners, or by other techniques suitable for coupling the product passage 110 to the product hopper 74. The product passage 110 may be removably coupled to the product hopper 74, or the product passage 110 may be configured to stay connected with the product hopper 74, as shown.

Figure 4:
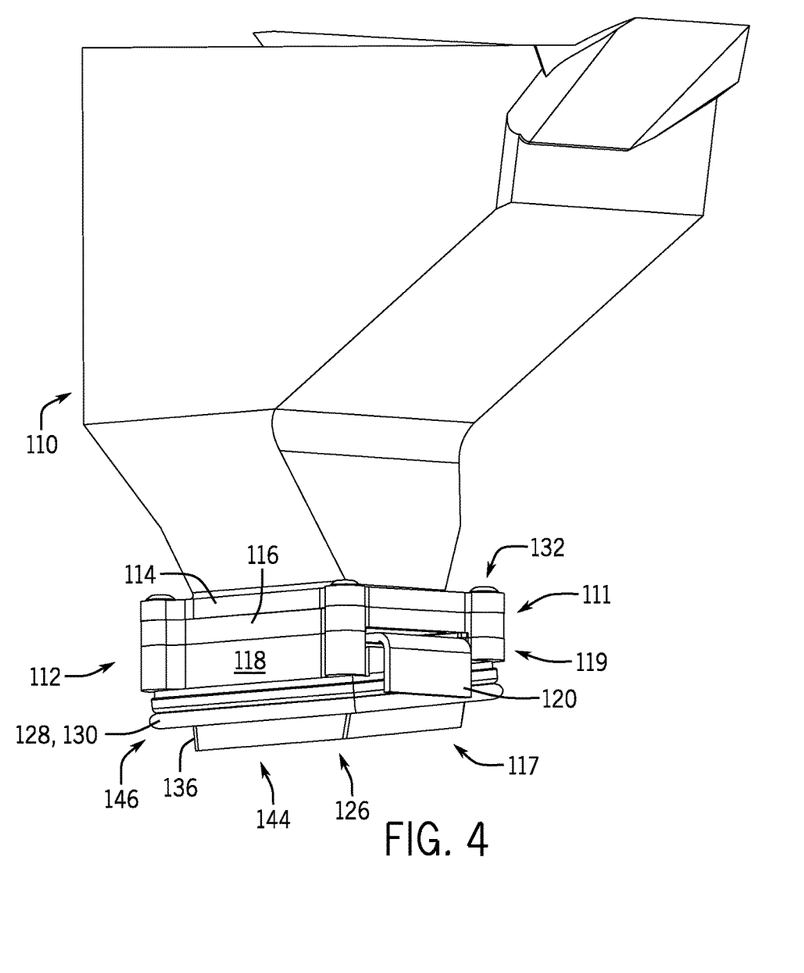
FIG. 4 is a perspective view of a flow control assembly coupled to a product passage.

FIG. 4 is a perspective view of a flow control assembly 112 coupled to the product passage 110. The flow control assembly 112 includes a housing 111 coupled to the product passage 110 and a gate 120 configured to block flow of agricultural product while the gate 120 is closed. The product passage 110 is coupled to the flow control assembly 112, which includes a flexible seal 126. The flow control assembly 112 enables the product passage 110 and the product hopper 74 to be uncoupled and removed from the product metering assembly 78, such that the product metering assembly 78 may be accessed. The product metering assembly 78 or other components of the agricultural row unit 16 may be accessed for repair and/or inspection, and so forth. In the illustrated embodiment, the flow control assembly 112 includes the interface plate 116, the outlet portion 118, the gate 120, gate supports disposed on an interior surface of the outlet portion 118, a gasket 128 of the flexible seal 126, including one or more gasket pieces 130, and gate fasteners 132. The gate 120 is selectively removeable relative to the housing 111. To facilitate flow of the agricultural product, the outlet portion 118 has tapered ends 136 that facilitate alignment and insertion of an outlet 117 of the housing 111 into a product meter opening (e.g., an inlet). The interface plate 116 and the outlet portion 118 form an opening 119 configured to receive the gate 120. Inserting the gate 120 through the opening 119 enables a user of the agricultural row unit 16 to remove the product hopper 74 without spilling product, thereby facilitating access to the product metering assembly 78.

The outlet portion 118 includes a bottom surface 144 which may be disposed at an angle of 0, 5, 10, 15, 20, 25, or 30 degrees, or any angles therebetween relative to the flange 114 to facilitate insertion of the outlet 117 into the product meter inlet. For example, the bottom surface 144, and thus flexible seal (e.g., connection) 126 may be oriented between about 0 to 30 degrees, about 5 to 25 degrees, about 10 to 20 degrees, and all ranges therebetween relative to the flange 114. The flexible seal also includes a flexible outer lip 146 configured to block flow of debris, water, dirt, and/or other external items from entering the product meter while the flexible seal is engaged with the product meter inlet. The gasket 128 may include one or more gasket pieces 130 (e.g., gasket segments) to form a seal between the outlet 117 and the product meter inlet. The gate 120 may be removed from the housing, thereby enabling product to flow from a storage portion of the product hopper 74 to the product meter assembly 78. The interface plate 116 and the outlet portion 118 are coupled to one another and to the flange 114 via the fasteners 132. The housing and the gate 120 may be uncoupled and removed from the product passage 110 by removing the fasteners 132 (e.g., to access an interior of the product passage 110).

Figure 5:
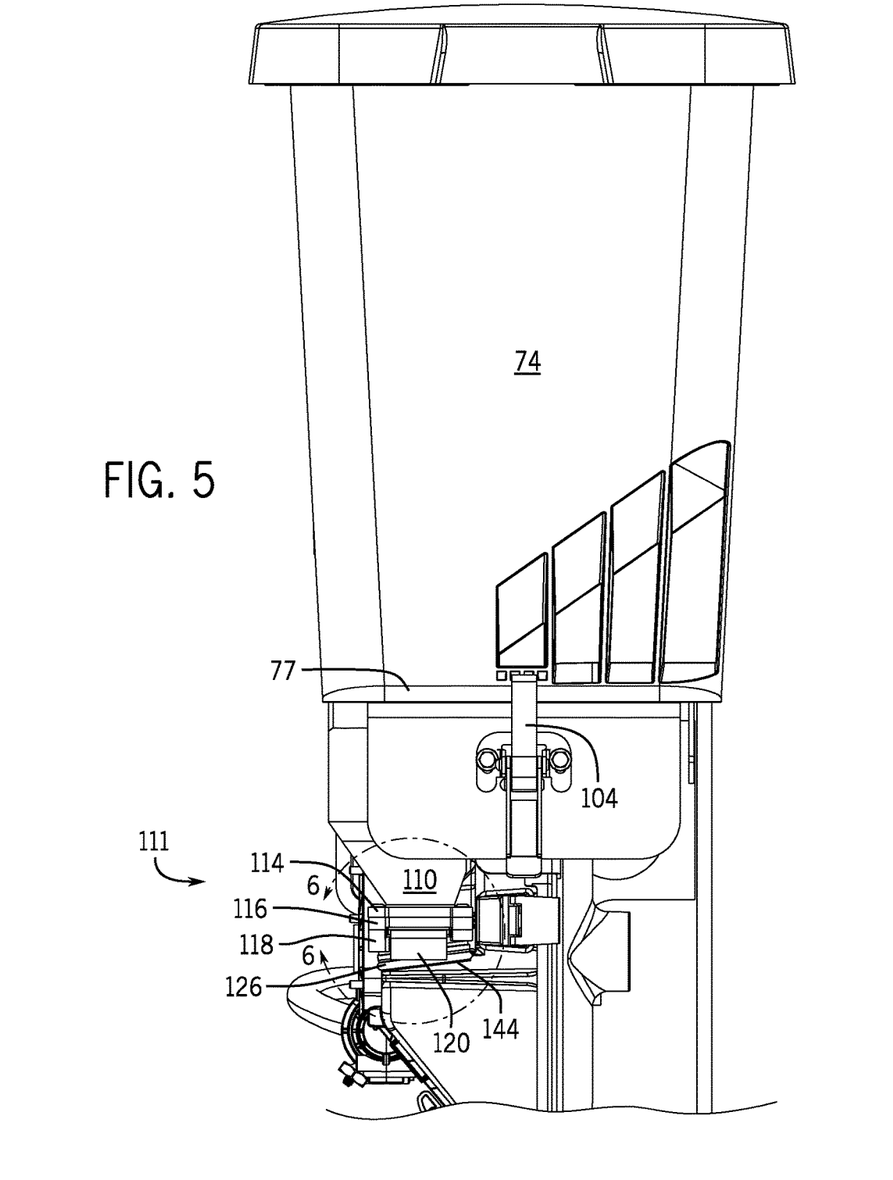
FIG. 5 is a rear view of the row unit of FIG. 2, illustrating the flow control assembly disposed between the hopper and a product metering assembly.

FIG. 5 is a rear view of the row unit 16 of FIG. 2, illustrating the flow control assembly 112 disposed between the product hopper 74 and the product metering assembly 78. In some embodiments, the housing 111 may be formed from the same material as the product hopper 74. The housing 111 may be formed from polyurethane, nylon, polyethylene, polypropylene, polycarbonate, polyvinyl chloride, acrylonitrile butadiene styrene, and/or any other suitable materials. In some embodiments, the outlet 117 may have an area of 30 to 45 cm$^2$ depending on the product capacity and the desired product flow rate from the product hopper 74. The gate 120 may be formed from materials similar to the material of the housing 111. In some embodiments, the gate 120 and the housing 111 may be formed from a low-density polyethylene. Utilizing lower weight plastics relative to the heavier plastics or denser materials may reduce the weight of the gate 120, the housing 111, and/or other components of the flow control assembly 112.

In some embodiments, latch 104 may be employed to couple the product hopper 74 to the support assembly (e.g., first support assembly, second support assembly, etc.). Alternatively, the latch 104 can be coupled on both sides of the product hopper 74. The latch 104 is configured to engage the lip 77 of the product hopper 74 to secure the product hopper 74 to the mounting assembly 72.

Figure 6:
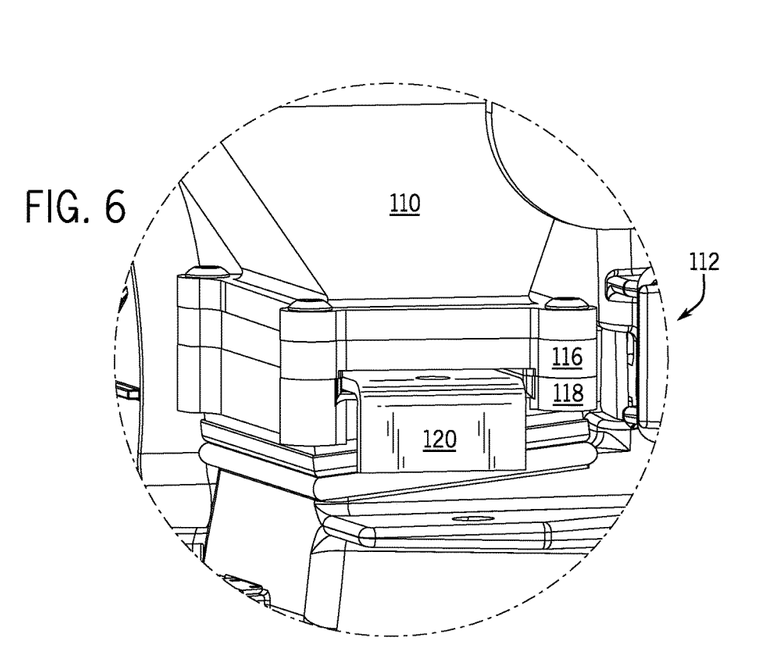
FIG. 6 is a perspective view of the flow control assembly of FIG. 4 with a gate in a closed position.
Figure 7:
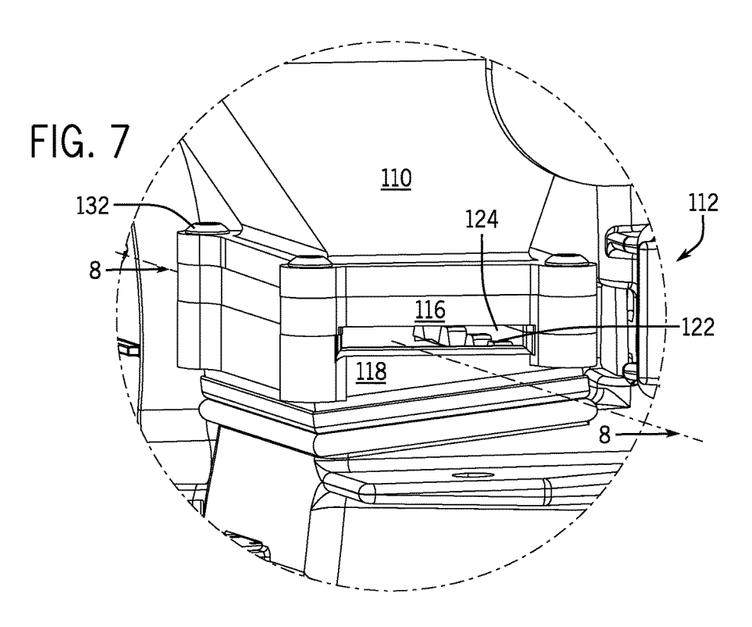
FIG. 7 is a perspective view of the flow control assembly of FIG. 4 with the gate removed.

FIGS. 6 and 7 are perspective views of the flow control assembly 112, taken within line 6-6 of FIG. 5. In FIG. 6, the gate 120 is in a closed/inserted position, thereby blocking flow to the product metering assembly. The gate 120 may be removed from the housing 111 entirely so that the gate 120 is not disposed between the interface plate 116 and the outlet portion 118, thereby facilitating flow from the product hopper 74 to the product metering assembly. In some embodiments, the gate 120 may be partially inserted from the flow housing 111 to reduce flow of product from the product hopper to the product metering assembly. When the gate 120 is fully disposed in the housing 111, the gate 120 blocks the flow of the product from the product passage 110 to the product meter assembly. As discussed in further detail below, gate supports 122 are configured to engage the gate 120 to support the gate 120 in the housing. In FIG. 7, the gate 120 is removed from the housing 111 (e.g., from between the interface plate 116 and the outlet portion 118, through the opening 119), thereby exposing the gate supports 122. The gate supports 122 are disposed along an interior surface 124 and are configured to engage the gate 120 such that the gate 120 is supported by the gate supports 122. The gate supports 122 include an upper surface onto which the gate 120 is configured to contact. The gate 120 experiences frictional forces from the contact with the upper surface, which may encourage the gate 120 to remain stationary while the gate is inserted and the agricultural row unit 16 is moving.

Figure 8:
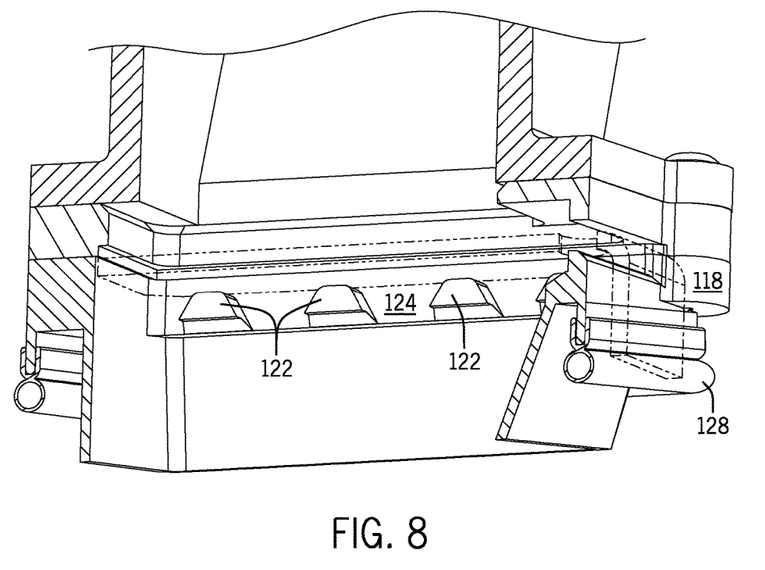
FIG. 8 is a cross-sectional view of the flow control assembly of FIG. 4, illustrating gate supports, taken along line 8-8 of FIG. 7.

FIG. 8 is a cross-sectional view of the flow control assembly 112 of FIG. 4, taken along line 8-8 of FIG. 7. As illustrated, the gate supports 122 are positioned equidistantly across the interior surface 124 of the outlet portion 118. In some embodiments, the gate supports 122 may be disposed at varying locations across the interior surface 124 of the outlet portion 118. For example, the gate supports 122 may be grouped in a middle portion of the interior surface 124 of the outlet portion 118. Alternatively, the gate supports 122 may be grouped toward the outer ends of the interior surface 124 of the outlet portion 118. The gate supports 122 may be any number of shapes, including circular, semicircular, triangular, square, rectangular, hexagonal, octagonal, or any other suitable polygonal shape. Additionally, there may be more or fewer gate supports 122 than included in the illustrated embodiment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural row unit, comprising:
   a hopper configured to store agricultural product;
   a mounting assembly configured to removably couple the hopper to a chassis of the agricultural row unit, the mounting assembly comprises a first support assembly and a second support assembly extending from the chassis, the first support assembly comprises a mounting portion configured to engage the hopper on a first side of a product passage of the hopper, the first support assembly comprises a laterally extending rod configured to engage a groove in a structural support extending vertically from the first side of the hopper; and the second support assembly is configured to engage the hopper on a second side of the product passage, opposite the first side; and
   a flow control assembly coupled to the hopper and configured to selectively block flow of the agricultural product through the product passage of the hopper, wherein the product passage is configured to convey the agricultural product from a product storage portion of the hopper to a product metering assembly of the agricultural row unit while the hopper is coupled to the chassis;
   wherein the mounting assembly is configured to engage the hopper remote from an outlet of the product passage and from the flow control assembly, and the mounting assembly is configured to support a substantial portion of a load associated with the hopper and any agricultural product stored within the hopper;
   wherein the flow control assembly comprises a housing coupled to the product passage and a gate selectively movable relative to the housing, the gate is configured to block flow of the agricultural product through the product passage while the gate is in a closed position, and the gate is configured to facilitate flow of the agricultural product through the product passage while the gate is in an open position;
   wherein the housing is configured to engage an inlet to the product metering assembly, and the housing comprises at least one tapered end configured to facilitate alignment of the housing with the inlet to the product metering assembly.

2. The agricultural row unit of claim 1, wherein the groove is C-shaped and configured to enable the hopper to rotate about the rod.

3. The agricultural row unit of claim 1, wherein the second support assembly comprises a support plate configured to engage a bottom surface of the hopper.

4. The agricultural row unit of claim 3, wherein the second support assembly comprises a latch configured to engage a lip of the hopper to secure the hopper to the chassis of the agricultural row unit.

5. The agricultural row unit of claim 1, wherein the housing comprises an interface plate and an outlet portion coupled to one another by at least one fastener, and the interface plate and the outlet portion form an opening configured to receive the gate.

6. The agricultural row unit of claim 5, wherein the at least one fastener is configured to secure the housing to a flange of the hopper.

7. The agricultural row unit of claim 1, wherein the flow control assembly comprises a flexible seal coupled to the housing, the flexible seal is configured to engage an inlet to the product metering assembly, and the flexible seal is configured to block flow of the agricultural product out of an interface between the inlet and the housing.

8. The agricultural row unit of claim 4, wherein the latch is welded to the support plate.

9. An agricultural row unit, comprising:

a hopper configured to store agricultural product;

a mounting assembly configured to removably couple the hopper to a chassis of the agricultural row unit, wherein the mounting assembly comprises a first support assembly and a second support assembly extending from the chassis, the first support assembly comprises a mounting portion configured to engage the hopper on a first side of a product passage of the hopper, the first support assembly comprises a laterally extending rod configured to engage a groove in a structural support extending vertically from the first side of the hopper, and the second support assembly comprises a latch having an arm configured to engage a lip of the hopper to secure the hopper to the chassis of the agricultural row unit, and the second support assembly is configured to engage the hopper on a second side of the product passage; and a flow control assembly coupled to the hopper and configured to selectively block flow of the agricultural product through the product passage of the hopper, wherein the product passage is configured to convey the agricultural product from a product storage portion of the hopper to a product metering assembly of the agricultural row unit while the hopper is coupled to the chassis;

wherein the mounting assembly is configured to engage the hopper remote from an outlet of the product passage and from the flow control assembly, and the mounting assembly is configured to support a substantial portion of a load associated with the hopper and any agricultural product stored within the hopper;

wherein the flow control assembly comprises a housing coupled to the product passage and a gate selectively movable relative to the housing, the gate is configured to block flow of the agricultural product through the product passage while the gate is in a closed position, and the gate is configured to facilitate flow of the agricultural product through the product passage while the gate is in an open position;

wherein the housing is configured to engage an inlet to the product metering assembly, and the housing comprises at least one tapered end extending from the housing configured to facilitate alignment of the housing with the inlet to the product metering assembly.

10. The agricultural row unit of claim 9, wherein the second support assembly comprises a support plate configured to engage a bottom surface of the hopper.

* * * * *